Figure 1:
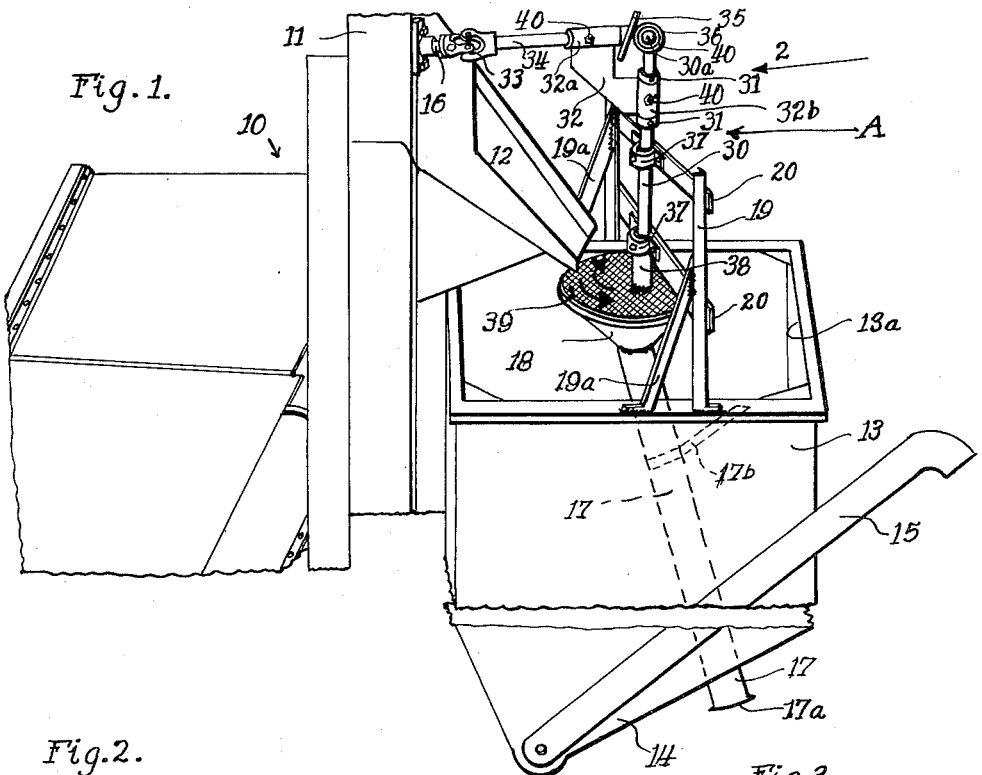

Oct. 2, 1956 V. BALMER ET AL 2,765,080
GRAIN CLEANER ATTACHMENT
Filed Jan. 10, 1955

INVENTORS:
VERNE BALMER AND
ELDON BALMER,
BY Wilbur A. E. Mitchell,
ATTORNEY.

United States Patent Office 2,765,080
Patented Oct. 2, 1956

2,765,080

GRAIN CLEANER ATTACHMENT

Verne Balmer, Loveland, and Eldon Balmer, near Ault, Colo.

Application January 10, 1955, Serial No. 480,682

3 Claims. (Cl. 209—350)

This invention relates to farm machinery adapted for the harvesting of matured small grain crops, commonly called combines, and which is used to pick up or cut the matured crop and to thresh the crop and deliver the threshed grain into a hopper from which an elevator carries the harvested grain for delivery at an adjustable discharge point. Much dirt, small stones and refuse, is picked up by the machine, as the grain is harvested, called tare, and heretofore, as far as known, a so-called cylindrical augur-operated scour cleaner attachment has been used in the transmission line of travel of the grain, after threshing and before deposit thereof into the hopper, to try to eliminate that tare, as the method for eliminating that tare but without satisfactory result. We illustrate our cleaner attachment in connection with a bean threshing machine.

In the threshing of such as beans, heretofore, too much of the dirt and refuse is pushed through the horizontal cylindrical sieve scour-augur cleaner, due to the beans being lighter in weight than the dirt and stones and refuse, the beans accumulated at the top of the mass and the dirt at the bottom thereof, as the mass is moved through the tube screen by the augur thereof, resulting in only about the lower half of that horizontal screen cleaner tube acting to clean the beans. To overcome that difficulty, we have designed a novel cleaner in the space provided, in the line of travel of the threshed beans and before they are deposited into the hopper, which will take advantage of the lightnes in weight of the beans in helping to effect their separation from the stones, dirt and refuse mixed therewith, by an entirely different structure and method than that of the old type scour-cleaner-cylindrical-tube-screen-augur-operated type heretofore used and mentioned hereinbefore.

It is, therefore, a principal object of this invention to provide a grain cleaner screen of flat construction in a horizontal position and rotatable in a horizontal plane on a vertical axis by a pitman-like action, and positioning the cleaner in the line of travel of the threshed grain into the hopper of the thresher machine, so that the grain falls onto that screen, with means for directing the dirt falling through the screen to a point outside of the hopper, and then the grain falls from that rotating screen into the hopper.

Another object of this invention is the provision of an attachment for a threshing machine, of the type described, for cleaning the grain before it is deposited into the hopper of the machine, by providing a horizontally rotatable cleaner screen means pivotally mounted on a vertical pivot axis, for partial clockwise and counter-clockwise rotational movement of the screen means as the grain falls thereon, with a dirt collector and diverting means spaced from and below the screen means for directing the dirt falling through the screen means away from the hopper, positioning the cleaner screen means just above the hopper and in the path of fall of the threshed grain from the machine thereinto, and operating the attachment with power from the thresher machine, whereby the mass of threshed grain and dirt carried therewith will fall onto the back and forth clockwise and counter-clockwise rotary moving horizontally positioned cleaner screen means, and the dirt and stones of that mass will fall through that screen means and be caught and directed by the dirt collector and diverter away from the hopper, and whereby the grain, being lighter in weight, and as caused further by that screen means movement, will remain at the top of that mass on that screen means and be moved, by that clockwise and counter-clockwise movement of the screen means, outwardly of the outer edges of the cleaner screen means when and where the grain will fall then into the hopper as cleaned grain.

Another object of our invention is the provision of novel wabble plate means for effecting pitman-like rotatable movement of the screen means.

Figure 2:
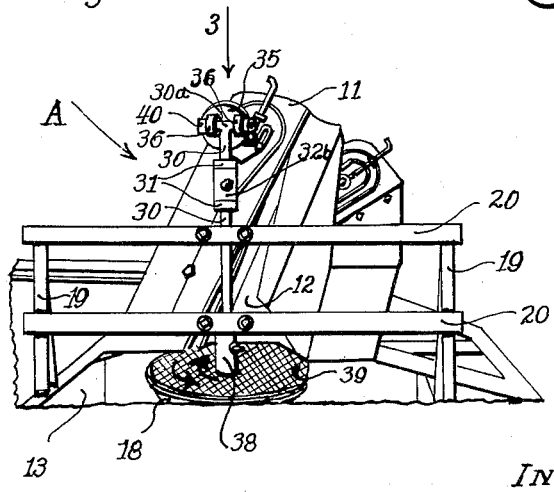
Figure 3:
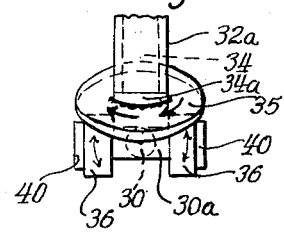

Other and further objects will be apparent from the disclosure herein to those skilled in the art, including from the drawing of a preferred embodiment and application of our invention to a bean threshing machine, in which drawing:

Figure 1 is a partial front elevational view of our attachment mounted on the hopper and as viewed from the position of the operator driving the tractor pulling the machine 10;

Figure 2 is a partial side view thereof, taken in the direction of the arrow 2 of Figure 1; and Figure 3 is a partial enlarged view of the wabble plate 35 mechanism, for effecting operation of the screen 39, taken in the direction of the arrow 3 of Figure 2.

The thresher machine, illustrated partially in Figure 1, is of conventional design, indicated generally as 10, and is of the type which picks up the wind-rowed cut dry beans still on their stalks, conveys them rearwardly and upwardly to a threshing mechanism part of the machine, and discharges the threshed beans into the open top portion 13a of the hopper 13 by means of the chute 12, no part of which is any part of this invention or attachment. It will be understood that such a machine 10 has a belt conveyor within the housing portion 11, operated by a pulley on a power drive shaft 16. Shaft 16 is suitably journalled in that conveyor housing, and has one end protruding through the conveyor housing on the hopper 13 side as illustrated in Figure 1.

Our cleaner attachment invention, indicated generally as "A," is mounted on the top frame edge 13a of the hopper 13, by welding two upright angle iron posts 19, each with supporting arms 19a, to that open topped hopper frame 13a, and with a pair of spaced apart horizontal cross bars 20 each in turn welded to those posts 19, all as illustrated in Figures 1 and 2, with said posts and bars comprising a rigid frame to which our attachment is operably secured.

The hopper 13 has a lower downwardly slanting floor 14, for directing the beans falling therein to one point, and it will be understood that there is an augur means at that point which carries the beans up a discharge pipe 15, in conventional manner.

We journal a round rotatable shaft 30, by means of a pair of self-aligning bearings 37, with each bearing secured by bolts midway of and to a bar 20, with the bearings aligned vertically as illustrated, so that said shaft is rotatably carried by and operable for revolution in said bearings. The bearings 37 each have an inner collar, not illustrated, which is rigidly secured around the shaft, at that point, with a roller bearing around that collar, and an outside bearing collar-strap, known as the conventional self-aligning type of bearing, as it holds the shaft against end-play-movement by its outer collar strap and permits the shaft to revolve therein. It will thus be seen that shaft 30 is carried and rotatably held in its vertical position, illustrated, by the pair of self-aligning bearings 37 just explained. A tubular member 38, having an inside diameter suitable for insertion over the shaft 30, has one of its ends welded to the center of a circular suitable sieve screen 39, so as to rigidly connect the screen thereto, and with the screen at a right angular plane to the longitudinal center of the tube member 38, and the member 38 is inserted over the lower end of the shaft and rigidly keyed thereto, by suitable removable means, at the lower end of the shaft below the lower bearing 37, so that 38 and 39, as a unit, will act as part of the shaft 30 and rotate with it. Member 38 is placed on the shaft with a slight distance between 38 and the lower bearing 37, so as to permit free rotation of 30 in its bearings. An opening, not illustrated, is provided in the floor of the hopper 14, adapted to tightly receive a dirt discharge tube 17 extending upwardly therethrough. Tube 17 has its lower end 17a open, and is supported by a pair of arms 17b, extending from the sides of the hopper 13, as illustrated, and so as to position the tube 17 with its upper end below and centrally of the horizontal screen 39. A funnel head 18 is suitably removably secured to the top of the tube 17, as illustrated, and is of a size so that its upper edge is of an equal diameter as that of the screen 39. The upper edge of 18 is positioned just below the screen 39 and with a slight space therebetween. It will be noted that the shaft 30, with its lower screen 39 secured thereto, as just explained, is rotatably held by its bearings 37 on the cross bars 20, centered with relation to the open top 13a of the hopper, and with the screen member 39 positioned parallel with the top of the hopper and under the discharge end of the chute 12, so that beans falling from 12 will be piled on that screen.

We provide a novel power means connection with the power shaft 16 for effecting pitman-like clockwise and counter-clockwise rotation of the shaft 30, with its screen 39, thereby, which we term wabble-plate means. Shaft 30 extends in length well above upper bearing 37, and at its upper end has an integral rigid stub cross round extension portion 30a, formed with relation to 30 as the cross-bar portion of a T. We use a right angular web L-shaped member 32, at each extremity thereof, as illustrated, having a tubular bearing member 32a and 32b at right angle relationship to the other thereof. Bearing member portion 32b is of a size adapting it for slidable insert of shaft 30 therein and for being held rotatably thereon and by a lower collar 31 therebelow on the shaft. Collar 31 is suitably set-screw-keyed to the shaft 30. Another collar 31 of identical nature is also so keyed to the shaft 30 above portion 32b, to confine 32b between those 31 and so as to permit 30 to rotate within 32b without the two collars 31 binding against 32b, as collars 31 rotate with 30. The other bearing portion 32a of 32 is similar to 32b, and is adapted to have a shaft 34 rotate therein. We provide a rotatable shaft 34, with its right hand end, as illustrated in Figure 1, formed of larger diameter to form a shoulder portion 34a adapted to ride against the adjacent end of the bearing portion 32a, with the shaft rotatably held within bearing portion 32a and extending to a point adjacent the power drive shaft 16. At the latter end of shaft 34, just mentioned, that shaft is connected with shaft 16 by a conventional universal joint 33, so that shaft 16 will rotate shaft 34 with it and at the same time shoulder 34a thereof will ride against the end of bearing portion 32a. The shoulder portion 34a has its outside extreme end, remote from its shoulder end surface which rides against the end of bearing portion 32b, and which is on the right end as illustrated in Figure 1, formed in a plane which is at a horizontal right angle to the longitudinal axis of shaft 34 but with a vertical angle of about thirty degrees to the longitudinal axis of that shaft, for reason to be explained, to which surface we weld a flat disc member 35, which we term a wabble plate, as illustrated, for rotation of that member 35 by shaft 34. One the ends of the top cross-T portion 30a of shaft 30 we conventionally secure a conventional self aligning bearing-roller wheel 36, with one at each end of that T portion, as illustrated, each having an inner collar 40 rigidly keyed to its end of 30a and over which a self-aligning roller bearing rides and with an outer wheel collar riding on and aligned over that bearing. Referring to Figure 1, it is to be noted that we construct the parts just described so that the peripheral surfaces of the two roller wheels 36 will be in contact and ride against the adjacent disc 35 at all times; from which it will be seen that revolution of shaft 34, and with 34 its integral enlarged shoulder portion 34a and its disc or wabble plate 35, will cause said wabble plate 35 to revolve with 34 on the longitudinal axis of 34 held by 32a, and disc 35, due to its explained thirty degree angular securement to 34a, will, in effect, wabble upon each revolution of its shaft 34—meaning, as viewed in Figure 3, with each complete revolution of shaft 34, disc 35, riding against wheels 36, will exert a horizontal pressure against one and then the other of said wheels, which pressure, transmitted through 30a to rotatable shaft 30, will cause one complete back and forth rotation of shaft 30 and its screen 39, to the extent of about thirty degrees rotation of 30 and 39 in each direction, being a pitman-like effected movement of that screen. To be more specific, looking down upon that structure, from above, as viewed in Figure 3, and, as there illustrated, assuming the shaft 34 turns its 35 clockwise, then the said thirty degree held position of 35, with relation to the longitudinal axis of 34, upon revolution of 35 by 34 in one complete such revolution, will cause, in such 35 clockwise turning: in the first quarter revolution of 35, as there viewed and just explained, a complete approximate fifteen degree counterclockwise turning of the shaft 30, as a result of pressure exerted by 35 through left 36 and 30a; in the continued and next or second quarter clockwise revolution of 35, which would be to a one-hundred-eighty degree opposite position of 35 from that illustrated, abutting pressure by 35 through right 36 and 30a would cause a return turning movement of 30 through its 30a and wheels 36 to the solid line position, being about a fifteen degree clockwise turning of 30—30a and 36 from the position at the end of the just mentioned first quarter revolution of 35; in the continued and next or third quarter clockwise revolution of shaft 34 and with it of 35, an approximate fifteen degree clockwise turning of 30—30a and 36 would be caused by the abutting pressure of 35 through right 36 and 30a, completing a full thirty degree clockwise turning movement of the shaft 30 in its bearings 37; and the continued and last quarter clockwise revolution of 35 by 34 would cause about a fifteen degree counterclockwise turning of the shaft 30 as a result of abutting pressure exerted by 35 through left wheel 36 and portion 30a, completing a full thirty degree counter-clockwise turning movement of the shaft 30 in its bearings 37. In each of the phases of turning movement of shaft 30, it is to be understood that screen 39 and its tube 38 to which it is attached, as a unit, being rigidly secured to the lower portion of 30, revolve with that shaft 30. In the construction of the angle portion of shoulder 34a, and securement of disc wabble plate 35 thereto, it is apparent, that, within certain limits, the greater the angle of such securement of that disc, with relation to the longitudinal axis of the integral shaft 34, the greater the amount of back and forth pitman-like turning of the shaft 30 will be effected thereby, through wheels 36 and cross portion of 30, designated as 30a, upon operation of our attachment, and, conversely, the lesser the angle of that disc 35 then the lesser the amount of such back and forth turning of 30 will be effected thereby; and by amount of such turning, we also mean speed of such turning in connection therewith for a given revolution of shaft 34 integral part of 35. We sometimes make the shaft 34 and its so-called integral shoulder part, 34a, previously explained, removably rigidly and integrally secured together, so that different shoulders 34a can be substituted, with different angle discs 35, for reasons just explained, upon varying conditions of grain cleaning use of our attachment. Tubular screen collar 38 is removably rigidly secured to the lower part of shaft 30, for the reason that there are times, in varying conditions of use, when it is necessary to replace the screen, by removing 38, and replacing it with a different screen having a different diameter or having different sized individual screen meshes, or both, to accommodate an efficient cleaning of the type of grain being threshed and cleaned thereby and the quantity of dirt, stones and refuse coming through the thresher with the grain in each individual field. The back and forth rotating action of our horizontal cleaning screen, we have found, amounts to a self-cleaning type of screen in use, as that action effects both a so-called sideways and outward-centrifugal-like movement of the mass of grain and dirt therewith deposited on the top of the screen, and that combined back-and-forth-rotational-effect movement acts to cause such mass to clean the individual screen meshes. We sometimes construct the upper open funnel diameter edge a little greater than that of the cleaner screen 39, when cleaning grain having hard dirt and stone particles larger than the individual grain pellets, for the reason that the rotating action of the screen acts to slightly throw the grain pelles therefrom after those pellets are moved, by that resulting action of the mass, to the upper and extreme edge of that mass, on the screen, while the larger dirt and stone particles remain in the lower part of that mass and so they fall directly over the edge of that screen into the dirt removing funnel. In construction we make the funnel 18, and its tube 18, supported by straps 17b, so that a different size funnel can be used, by replacing the one being used, under varying conditions of use, just explained. Instead of the wabble plate 35 power connection for effecting alternate rotation of the screen 39, it is to be assumed that a true pitman-like crank power connection could be used, for transmitting the power from 16 to the shaft 30 for effecting such rotation.

In assembling our attachment, after the frame 19–19–20–20 is secured in place; then shaft 34, without 33, but having 34a and 35 at one end thereof is inserted into a portion 32b of a member 32; then a shaft 30 has the strap bearings properly spaced thereon after the shaft, without 36 and 40, is inserted downwardly through portion 32b of 32, with upper collar 31 first in place on the shaft and lower collar 31 placed on the shaft before the bearings; then the roller wheels 36 and their inner collars 40 are secured to the cross T portion of the shaft 30a; then the screen unit 39—38 are secured to the shaft, by a removable stud set screw through 38, not illustrated, in conventional manner, at the lower end of the shaft 30; then the bearings 37 are each bolted to their respective position and on a cross bar 20; then universal joint 33 is secured to the other end of 34 from 35; with the universal joint then being key locked and set-screw bolt secured to the power stub shaft end 16 so that there is no play between shoulder portion 34a and adjacent bearing portion 32a. This general assembly order could be varied slightly, in accordance with the disclosure made.

Having thus disclosed, explained, and taught a preferred embodiment of our invention in detail, since it will be apparent to those skilled in the art that various changes and modifications may be made therein, it is to be understood that we wish to be bound only by the scope and spirit of the hereunto appended claims.

What we claim and desire to secure by Letters Patent is:

1. A grain sorting device, comprising, in combination, an open top grain hopper having an adjacent rotatable shaft source of power and a rigid frame connected to and across its top, a rotatable shaft vertically mounted on and journal-held to and by the frame and with the longitudinal axis thereof positioned in the center of the projected plane of the top of the hopper, self-aligning-anti-end-play-bearing means secured to the frame for so rotatably mounting and rotatably holding the shaft on and by the frame, an operable flat grain cleaner screen disc horizontally rigidly and removably secured to the shaft for rotation therewith and positioned thereon so as to receive grain directed onto that disc, means for so securing the disc to the shaft, operable rotatable pitman-like-power-transmission means connected with the shaft and being rotatably carried on and by the shaft and adapted upon operation for effecting back and forth alternate rotation of the shaft and its disc, means for connecting the power transmission means in power transmitting relationship to the source of power, said means for connecting the power transmission means in power transmitting relationship to said shaft including means for so rotatably carrying the pitman-like-power-transmission means on and by the shaft, dirt collecting and tube discharge means carried by the hopper and positioned under the disc and adapted for collecting and directing dirt falling from the disc to a point outside of the hopper, and means connected to the hopper for so carrying and positioning the dirt collecting and discharge means.

2. A grain sorting attachment, adapted for use with a machine having an open top grain hopper having a lower grain discharge portion and having a companion source of power, and with a threshed grain supply delivered by a chute into the open top of the hopper, and the machine also having a rotatable power take-off shaft extending from the side of the machine adjacent the chute, comprising, a rigid frame secured to and extending over the open top of the hopper, means for so securing the frame in such position to the hopper, a horizontally rotatable flat grain cleaner means rotatably mounted in a horizontal plane on a vertical axis on the frame and substantially under the chute and above the hopper in the line of travel of the threshed grain from the chute into the hopper, means including a second rotatable shaft for so rotatably carrying and mounting the flat grain cleaner means by and on the frame, power connecting and transmitting means between the source of power and the second rotatable shaft for transmitting power to the second shaft and adapted for effecting back and forth rotary pitman-like-effected rotation of the second shaft and including a wabble plate means and companion abutting roller wheel means against the wabble plate means, dirt collecting and discharge means carried by the hopper and positioned spacedly below the grain cleaner means and adapted for directing the dirt from the cleaner means out of the hopper separate and apart from the lower grain discharge portion of the hopper, and means connected to the hopper for so positioning the dirt collecting and discharge means.

3. A grain cleaning attachment adapted to be secured to a machine having an open top hopper, a grain discharge chute portion positioned for directing threshed grain into the open top of the hopper, a power driven rotatable shaft with a portion of that shaft extending from the side of the machine adjacent the upper portion of the chute, and a grain discharge portion from the lower portion of the hopper, comprising, a rigid frame carried by and secured to and extending across and above the peripheral top edges of the open topped hopper, means for so securing the frame to the top edges of the hopper, a vertical rotatable second shaft journalled for rotation on the frame and positioned centrally of the frame and of the horizontal projected plane of the top edges of the hopper, means for so journalling the second shaft on the frame and including means for supporting said shaft thereon against end play movement, a flat grain cleaner mesh screen removably and rigidly secured to and carried by the lower end of the shaft and with the screen carried in a horizontal plane which is substantially parallel with the top edges of the open topped hopper, means for so removably securing the screen to the second shaft with the screen in said position, a dirt collecting and diverting means carried by the hopper and positioned below the screen and being adapted for collecting dirt particles passing through the screen and for directing that dirt to the exterior of the hopper, the frame and second shaft and screen on that shaft being so proportioned and positioned so that the screen is positioned further in the line of travel of threshed grain falling down the chute so that the grain will fall onto that screen, the second shaft having an integral upper rigid cross-T portion, a pair of like roller wheels with one journalled at each end of the cross-T portion of the second shaft, identical means for journalling and holding each roller wheel on its end of the cross-T portion of the second shaft, a third rotatable shaft adapted to be positioned and extend from adjacent the power driven first shaft portion rotatably extending from the side of the machine to a point adjacent the roller wheels, a universal joint connecting the one end of the first shaft extending from the side of the machine with the adjacent end of the third shaft, means carried by the second shaft for so positioning and rotatably carrying the third shaft and for journalling the third shaft for rotation and including a web-L-shaped member having right-angularly opposed bearing members, one of said right-angularly opposed bearing members of the L-shaped member being adapted to have the third shaft rotatably carried therein, and the other of said right-angularly opposed bearing members of the L-shaped member being adapted to have the second shaft rotatably extend therethrough, flat wabble-plate means rigidly and integrally removably secured to the other end of the third shaft opposite the universal joint and in a plane of less than ninety degrees relative to the longitudinal axis of the third shaft and being of a thickness so as to have its flat surface extending in abutting relationship against the outer peripheries of the like pair of roller wheels, and means for so securing the wabble-plate means to said other end of the third shaft.

References Cited in the file of this patent

UNITED STATES PATENTS

| | | |
|---|---|---|
| 456,584 | Morse | July 28, 1891 |
| 1,075,474 | Hall | Oct. 14, 1913 |
| 1,301,362 | Benjamin | Apr. 22, 1919 |
| 1,759,653 | Love | May 20, 1930 |
| 1,812,532 | Hogan | June 30, 1931 |

FOREIGN PATENTS

| | | |
|---|---|---|
| 49,894 | Germany | Dec. 4, 1889 |